UNITED STATES PATENT OFFICE.

JAMES JACKSON, OF CHICAGO, ILLINOIS.

IMPROVEMENT IN BLUING-POWDERS FOR LAUNDRY USE.

Specification forming part of Letters Patent No. 155,239, dated September 22, 1874; application filed February 23, 1874.

*To all whom it may concern:*

Be it known that I, JAMES JACKSON, of the city of Chicago, in the county of Cook and State of Illinois, have invented a new and useful Improvement in Bluing-Powders for Household and Laundry Purposes, of which the following is a full description:

The object of my invention is to prepare a powder or compound to be used as a bluing-powder for household and laundry purposes; and its nature consists in so combining the ferrocyanide of potassium with the sulphate of iron that it will, upon the application of water or moisture, form a deep-blue liquid.

To enable others skilled in the art to make and use my improved powder, I will now describe the same.

I take of the ferrocyanide of potassium, (red prussiate of potash,) and reduce it to a fine powder in a dry state. I then take the sulphate of iron, (copperas,) and also reduce it to a fine dry powder, and mix them together in equal quantities. Two ounces of the mixture dissolved in one quart of water will give a concentrated bluing-fluid.

The mixture has a strong affinity for water, but it will dissolve more readily if the water is hot or boiling.

In use, however, it will be found advisable to keep it in the powdered state, and as much as can be taken up by the thumb and forefinger will be sufficient for an ordinary tub of water. It can be dissolved and poured in, or it may be applied directly.

I take the component articles as they are prepared for commerce, and when the mixture is completed I put it in suitable boxes or vials for the market, as it requires to be excluded from the air when kept for any considerable length of time, as the moisture of the atmosphere will injure it.

What I claim as my invention, and desire to secure by Letters Patent, is—

As a new article of manufacture, the powdered mixture composed of the ingredients substantially as and for the purposes specified.

JAMES JACKSON.

Witnesses:
L. L. BOND,
O. W. BOND.